Sept. 27, 1966  C. E. GUTSHALL  3,275,055
BOLT AND WASHER ASSEMBLY WITH COOPERATING
PAWL AND RATCHET MEANS
Filed Feb. 4, 1964  2 Sheets-Sheet 1
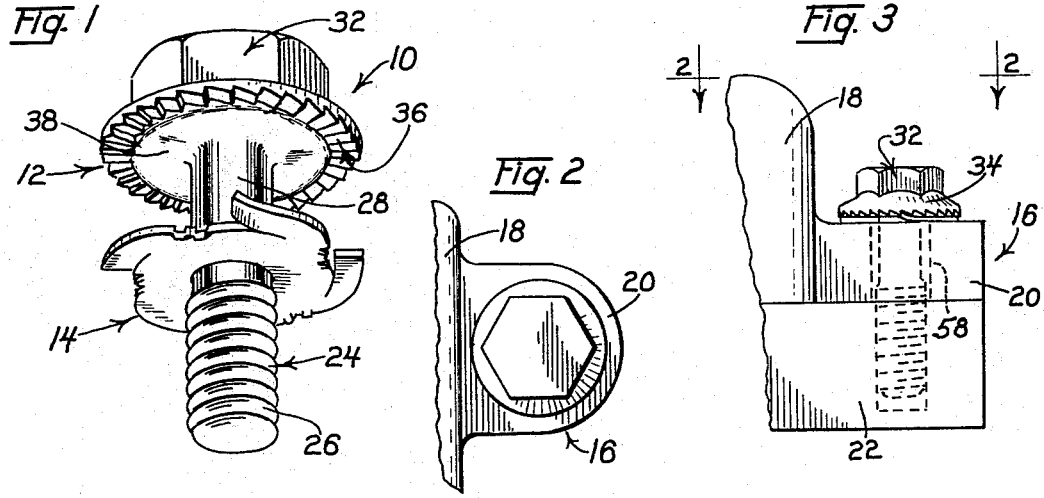
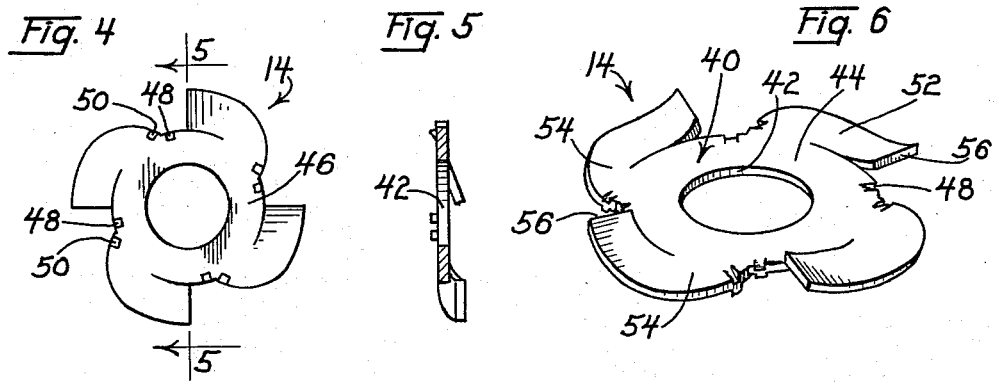
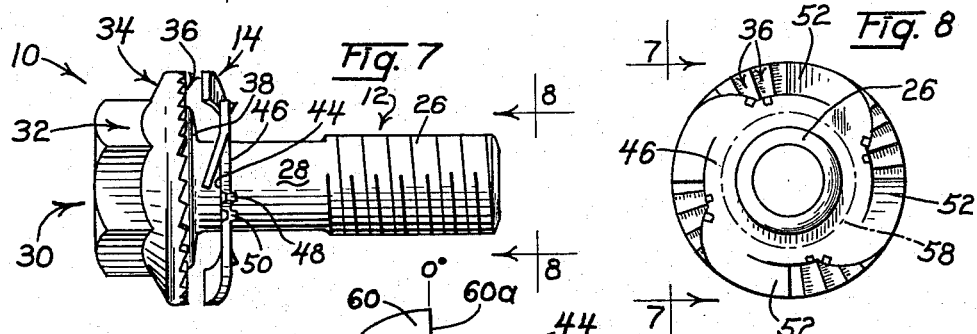
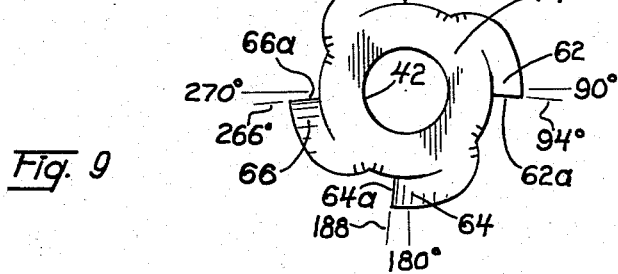
INVENTOR.
Charles E. Gutshall
BY
His Att'y

United States Patent Office 3,275,055
Patented Sept. 27, 1966

3,275,055
BOLT AND WASHER ASSEMBLY WITH COOPERATING PAWL AND RATCHET MEANS
Charles E. Gutshall, Roselle, Ill., assignor to Illinois Tool Works Inc., Chicago, Ill., a corporation of Delaware
Filed Feb. 4, 1964, Ser. No. 342,486
3 Claims. (Cl. 151—37)

This invention relates in general to fastening devices and more particularly relates to a washer construction and cooperating threaded member such as a bolt or the like.

The mounting of metallic parts in a precision relationship in a manner where the parts will not shift relative to each other when the assembly is subjected to a high-heat and high vibrational environment is a difficult problem. For example, in the mounting of exhaust manifolds on automobile engines, it has been found very difficult to keep the bolts from loosening when the engines are in actual field use. The fastener device must be designed in such a way that it will accommodate not only the extreme heat environment when the engine is running, but must maintain the parts in assembled relation through the repeated heating and cooling that is afforded by the intermittent use of an automobile in addition to the vibrations encountered by normal vehicular use. Thus, locking devices which rely upon a spring action to provide a constant bias to prevent retrograde rotation of the fastening bolts have proved ineffective due to the annealing effect of the high heat environment which causes the spring type lock-washer to lose its spring action.

It is a general object of this invention to provide a fastener device which may withstand a high heat environment, a vibrational environment and the repeated thermal expansions and contractions involved in fastening applications where unauthorized retrograde movement must be prevented.

It is a further object of this invention to provide a fastener device which provides a good metal to metal contact between a large area of a bolt and a washer and between a large area of the washer to a workpiece so as to provide a very solid load bearing construction while simultaneously preventing unauthorized retrograde rotation of the fastener.

It is a further object of this invention to provide a bolt having a bearing surface which engages a washer in a manner to positively deform the washer so as to iron out any residual spring in the washer to workpiece interface.

Still another object of this invention is to provide a washer and bolt construction which causes positive and deep penetration of teeth located on the underside of the washer into a workpiece surface with direct in line compression force from the bolt being transmitted to at least some of the teeth.

Still another object of this invention is to provide a washer which cooperates with a workpiece and with the underside of the head of a bolt member which is characterized as having spring-strut ratcheting type arms having a spring action upon initial assembly and which, after annealing by the heat environment, become mechanical struts imposing a wedging action between the underside of the head of the bolt and the teeth located on the lower side of the washer.

A further object of this invention is to provide a washer having spring arms which cooperate with ratcheting teeth on a bolt member so as to provide a "one way clutch" or locking clutch action on initial tightening, the ratchet teeth providing a surface cooperable with the spring arms after annealing of the spring arms to prevent retrograde rotation of the bolt.

A further object of the invention is to provide teeth on the underside of the washer for deep penetration of the work surface, said teeth being located in a manner to prevent relative shifting of the workpiece, washer, and bolt member.

A further object of this invention is to provide teeth on the underside of a washer so located relative to the spring arm members (which become mechanical struts) so as to provide substantially opposite facing abutment surfaces to provide a strong wedging action preventing retrograde rotation after annealing of the spring arms in the field environment.

A further object of this invention is to provide two rows of teeth on the washer workpiece engaging surface, which are disposed in an annular array in a manner to provide one row of teeth radially offset relative to the other set of teeth to prevent tracking, and thus further aid in resisting retrograde rotation of the parts after tightening.

A still further object of the invention is to provide individual washer teeth in rows as above set forth, which are so located on the washer that the teeth in one row are cocked relative to the teeth in the other row to prevent shifting of the parts and resist a camming out of the teeth surfaces from complementary apertures in the workpiece after penetration thereof.

The novel features which are characteristic of the invention are set forth with particularity in the appended claims. The invention itself, both as to its organization and its method of operation together with additional objects and advantages thereof, will best be understood by the following description of specific embodiments when read in connection with the accompanying drawings in which:

FIG. 1 is a perspective view of the washer and bolt member;

FIG. 2 is a top plan view of the bolt and washer shown in FIG. 1 assembled to a workpiece;

FIG. 3 is a side elevational view of the assembly shown in FIG. 2;

FIG. 4 is a bottom plan view of the washer shown in FIGS. 1-3;

FIG. 5 is a sectional view taken along lines 5—5 of FIG. 4;

FIG. 6 is a perspective view of the washer shown in FIGS. 4 and 5 from the top side thereof;

FIG. 7 is a side elevational view of the bolt and washer shown in FIGS. 1 and 3;

FIG. 8 is an end view along lines 8—8 of FIG. 7—a dot-dash line indicating the relative size of a workpiece aperture;

FIG. 9 is a top plan view of the washer showing a modification of the length of the arms;

Figure 10:
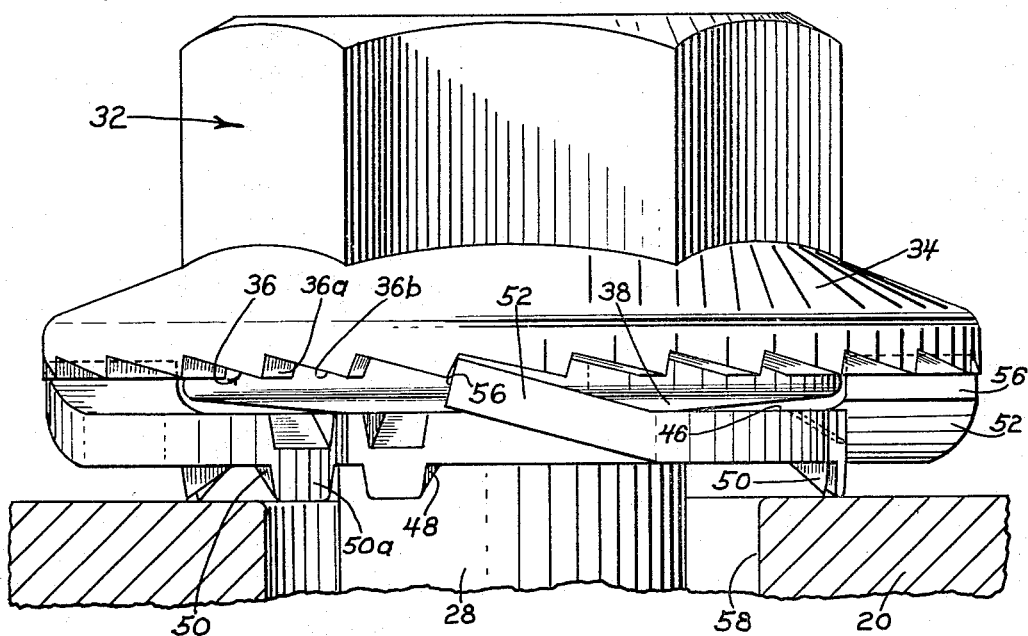
FIG. 10 is a fragmentary sectional view, on a greatly enlarged scale of the parts shown in FIG. 2 just prior to the tightening of the parts.

Returning now to FIGS. 1, 2 and 3 of the drawings, a preassembled fastener assembly 10 comprising a threaded bolt means 12 and a washer means 14 is adapted to provide an assembly 16 of workpieces 18 and 22 as shown in FIG. 3. For purposes of illustration, the workpieces 22 and 18 will be considered portions of a manifold assembly for an automobile, there being an apertured lug 20 in the upper workpiece 18 which is aligned with a threaded bore in the workpiece 22.

The bolt means 12 has an elongated shank 24 which is threaded at the entering end 26 and which has unthreaded section 28 adjacent the head portion 30. The washer 14 is trapped on portion 28 of the shank by the threads so as to prevent axial disengagement of the washer means 14 from the bolt member 12 while permitting relative rotation of the washer 14 on the unthreaded portion 28. The head portion 30 of the bolt is provided with torque imparting means 32, here shown in the form of wrenching flats, there being a radially extending skirt portion 34 located immediately below the flats 32. The underside of portion 34 is provided with a plurality of ratchet teeth 36, which are located in an annular ring radially outboard of and slightly axially offset from bearing surface 38, which completes the underside of the head of the bolt. The bearing surface 38 preferably has a very slight taper (in the neighborhood of 5° from a plane transverse to the axis of the bolt as best shown in FIG. 10) for purposes hereinafter appearing.

The washer means 14 comprises a body means 40 which is substantially flat, there being a central aperture 42 for receipt of the unthreaded bolt portion 28. The body means 40 comprises upper and lower surfaces 44 and 46 respectively, which are substantially parallel to each other, surface 44 engaging bearing surface 38 on the bolt head and surface 46 engaging the workpiece boss 20. A first annular row of teeth 48 is formed in the radially outward edge of the main body portion 40 and extends downwardly from surface 46. A second annular row of teeth 50 is disposed radially outwardly from the teeth 48 and the individual teeth in row 50 are obliquely disposed relative to the individual teeth 48. The teeth 50 are formed adjacent the ramp portion of strut-spring arm means 52 which merge with the main body portion 40 of the washer. The strut-spring arm means 52 are symmetrically disposed radially outward of the main body portion and the free ends 56 thereof are offset upwardly from surface 44. The ends 56 cooperate with the teeth 36 in a manner to be explained.

Figure 11:
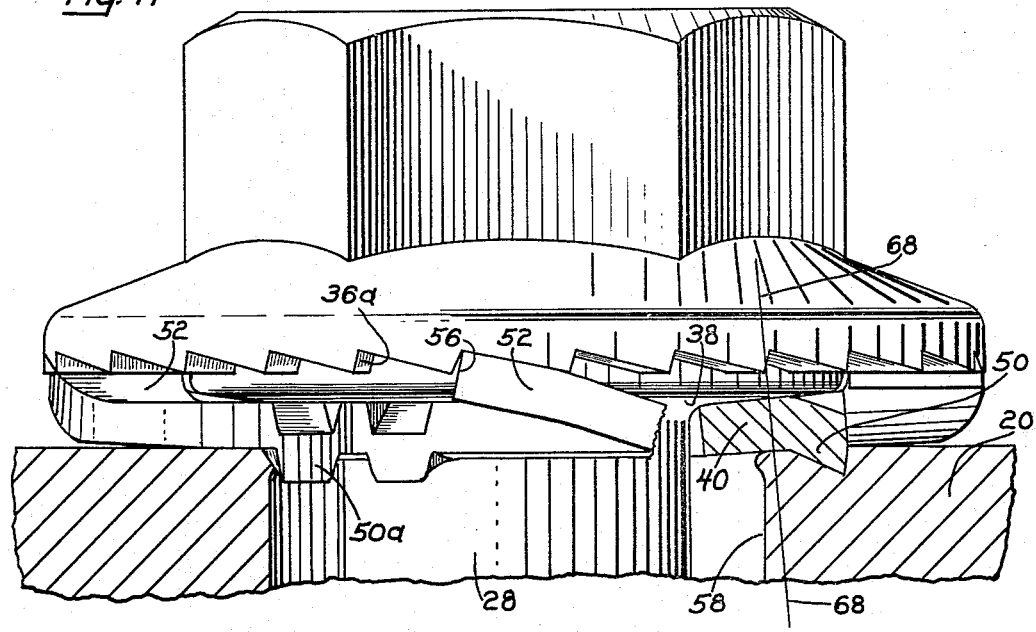
FIG. 11 is a fragmentary sectional view similar to FIG. 10 showing the assembly after the tightening of the bolt.

Returning now to FIG. 10, it will be seen that the bore 58 in the workpiece boss 20 is somewhat larger in diameter than the shank portion 28. As the head of the bolt is rotated, the washer 14 moves from the position shown in FIG. 10 to the position shown in FIG. 11. More particularly, FIG. 10 shows the teeth 48 and 50 prior to penetration into the workpiece boss 20, the arms 52 being shown in a relaxed position (not being stressed by the teeth 36). As the threads 26 cause the head 30 to come closer to the workpieces, the free ends 56 on the arms 52 slide along tooth surfaces 36b of the ratchet teeth 36, which imparts a downward force causing an initial partial penetration of the teeth 48 and 50 into the workpiece (a cast iron workpiece, for example), the initial partial penetration of the teeth preventing the washer from rotating and scoring the workpiece surface during further tightening. Stated another way, the reaction to the force on arms 52 imparted by the cam surfaces 36b on the teeth 36, is sufficient to cause a slight penetration of the workpiece surface by the teeth 48 and 50 to prevent the washer from rotating during the rotation of the bolt prior to substantial compressive forces on the teeth imparted by the surface 38 as the bolt is rotated into tight threaded engagement with the threaded bore in workpiece 22. As the bolt is rotated, surface 38 engages surface 46 causing the body 40 of the washer to move downwardly causing the deep penetration of the teeth 48 and 50. The final position of the parts is shown in FIG. 11 which shows that the slight taper of bearing surface 38 in the instant construction has caused a slight downward deformation of the washer inner margin into the hole 58 of the workpiece in a manner to iron out any possible residual spring in the washer-workpiece interface and in the washer-bearing surface interfaces. A direct compression force on the washer teeth 48 is provided due to the relative diameters and configurations involved (see construction line 68). Further, a substantial portion of the washer teeth 50 are also in a direct compression relationship between surface 38 and the workpiece. It is particularly important to note that there is a good metal to metal contact between surfaces 46 and 38 and surface 44 and the margin surrounding the aperture or bore 58 to provide, in effect, a tight laminar construction.

The spring-strut arms 52, due to the slight deformation of the washer, may have the undersurface thereof, particularly in the areas furthest radially outboard of the juncture of the arms with the main body portion 40, slightly raised off of the workpiece surface. It will be noted that free end surface 56 on the arms in cooperation with ratchet tooth surface 36a on the underside of the bolt provides a one way clutching action in cooperation with the teeth 48 and 50 which resists rotation. The cocking of individual teeth 50 and the location thereof are such that surface 50a of the teeth are substantially opposed to surfaces 56, which further prevents unauthorized retrograde rotation of the bolt. The arms 52 lose all inherent spring tendency upon the annealing thereof in the work environment, but due to the relative positioning of the various components of the washer relative to the tooth surfaces 36a, the arms become in effect mechanical struts preventing the bolt from rotation. The disposition of surfaces of the teeth 48 and 50 are such that they do not easily cam out of the workpiece, and further, bearing surface 38 prevents any effective removal of the teeth 48 and 50 from the complementary holes they have made in the workpiece.

An alternate embodiment of the construction has been shown in FIG. 9. The washer construction shown in FIG. 9 is substantially identical to the washer 14 and only the different parts will be discussed. The major distinction shown in FIG. 9 is that the arms 60, 62, 64 and 66 have different lengths as measured in the plane of rotation of the fastener. The essential object of varying the length of the arms is to provide a minimum counter rotation of the bolt until surface 36a engages the end surfaces of one of the arms. This may be accomplished in a variety of manners such as varying the length of the surface 36b on the teeth on the underside of the head of the bolt or by varying the position of the ends of the various arms as shown in FIG. 9. For example, if the successive teeth surfaces 36a on the bolt are 15° apart, then it would be theoretically possible to have a counter rotation of the bolt relative to the washer of just slightly less than 15°. By the construction shown in FIG. 9, one of the surfaces 60a, 62a, 64a or 66a effectively reduces the maximum counter rotation to approximately 4°.

From the foregoing it is seen that I have shown an assembly where the bolt bearing surface 38 provides a metal to metal contact over a large area of the bolt-washer interface and the washer-workpiece interface to provide a very solid construction therebetween, the surface 38 positively deforms the washer inner margin into the aperture 58 so as to iron out any residual "spring" in the washer-workpiece interface so that later annealing of the parts does not detract from this construction, and the surface 38 due to the almost direct compression forces involved as shown by line 68 in FIG. 11 causes a positive and deep penetration of the teeth 48 and 50 into the workpiece with the direct almost "in line" compression force on at least a major portion of all of the teeth. The surface 38 may have other configurations to provide the desired functions rather than the slight 5° taper shown, the major functional desirabilities thereof being set forth hereinbefore. It will be further observed that the washer has spring-strut ratcheting arm means 52 which provides opposed relatively large area flat surfaces to provide large metal to metal coactions with the workpiece and the bolt, and further the washer has radial rows of teeth which are offset relative to each other in a radial direction, and also the teeth of the two rows are obliquely disposed relative to each other to further provide effective non-camming out relationships upon encountering counter rotational forces. The arms 52 act as a one-way clutch or a locking clutch on initial tightening in cooperation with the teeth 56 of the bolt, and after annealing become a strut to provide a mechanical lock of the bolt by a wedging action between the teeth 48 and 50 and the tooth surfaces 36a. The spring action of the arms 52 is sufficient to cause an initial partial penetration of the washer teeth into the workpiece so as to prevent a scoring of the workpiece, and further the arms may be of different lengths to provide gradations to reduce the amount of backlash in the system. The fastening device has worked well in a difficult high temperature environment and high vibrational environment and has been very efficacious for its intended purpose.

Although various embodiments of the invention have been shown and described, it is with full awareness that many modifications thereof are possible. The invention, therefore, is not to be restricted except insofar as is necessitated by the prior art and by the spirit of the appended claims.

The invention is claimed as follows:

1. A fastener device adapted to fasten one apertured workpiece to a second apertured workpiece comprising bolt means and washer means, said bolt means comprising shank means having a threaded entering end and an enlarged head portion at the opposite end, said shank means having an unthreaded portion adjacent the headed end of less diameter than said threaded end portion, said headed end being characterized as having a bearing surface adjacent the unthreaded portion of the shank which tapers upwardly in a direction away from said unthreaded portion and outwardly toward the outer margin of the head and is disposed at an angle of substantially 95 degrees relative to the axis of said shank while extending radially outwardly a predetermined distance, a plurality of circumferentially arranged ratchet means disposed radially outboard of said bearing surface and generally facing the same direction as said bearing surface, said washer means being captively disposed on said unthreaded portion of said shank means intermediate said bearing surface and said threaded end portion and comprising apertured body means disposed substantially normal to the axis of said shank means and having first and second opposed parallel substantially flat surfaces for respectively engaging said bearing surface of said bolt means and said first workpiece, tooth means formed on the outer periphery of said second surface for engagement with said workpiece and circumferentially disposed spring-strut means integrally formed in said washer means radially outboard of said first and second surfaces defining free end surfaces offset from the body means for cooperation with said ratchet means located radially outboard of said bearing surface of said bolt means said bearing surface being adapted to distort said body means axially into the aperture of said first workpiece whereby said body assumes a dished configuration and said tooth means are forced into intimate engagement with said first workpiece, said dishing of said body means aggressively urging said spring strut means upwardly into intimate engagement and cooperation with said ratchet means.

2. Manifold assembly comprising,
 (a) a first manifold body member having a threaded aperture,
 (b) a second manifold body member having an unthreaded aperture larger than and aligned with said aperture in said first manifold body member,
 (c) bolt means having a shank means portion and a head means portion,
 (d) said shank means portion comprising a threaded entering end and an unthreaded portion adjacent said head means,
 (e) said head means comprising,
  (1) a torque imparting means portion,
  (2) a washer bearing surface portion, and
  (3) a ratchet surface portion,
 (f) said bearing surface portion being characterized as being intermediate the unthreaded shank means portion and the ratchet means portion and disposed at an angle slightly offset from a plane transverse to the axis of said bolt means and extending upwardly and outwardly away from its juncture with said unthreaded portion of said shank,
 (g) washer means mounted on said unthreaded portion of said bolt means intermediate said bearing surface portion and the margin of said second manifold body means surrounding the aperture means therein, said washer means comprising,
 (h) a substantially flat body means portion having a radial extent substantially coextensive with the extent of said bearing surface portion,
 (i) first and second tooth means disposed on the outer periphery of the underside of said washer means for penetrating and providing complementary surfaces in the margin of said second manifold workpiece surrounding the aperture therein,
 (j) said first tooth means comprising a row of teeth in direct line compression relationship between said bearing surface and said second manifold member workpiece and symmetrically disposed about said body means of said washer means,
 (k) said second tooth means comprising a second row of teeth being radially offset from and obliquely disposed relative to said first row of teeth and at least partially in direct compression relationship to said bearing surface and said second manifold workpiece margin surrounding the aperture therein,
 (l) spring-strut arm means having a first portion integrally attached to the radial margin of said body means of said washer means and having a second portion circumferentially disposed about said body means and provided with free ends cooperable with the ratchet teeth means on said head of said bolt means, the free ends being offset from the plane of said body means in a direction opposite to said first and second tooth means on said washer means, said threaded entering end of said shank means adapted to engage the threaded aperture of said first manifold body member thereby inducing tension in said bolt means, the bearing surface portion of said head means dishing said flat body means into the unthreaded aperture of said second manifold body member and embedding said first and second tooth means into the margin of said second manifold workpiece surrounding the aperture therein,
 (m) the end surface of said free arms cooperating with an abutment surface on said ratchet-teeth means to provide a one-way clutch lock on initial tightening of the bolt member and providing a mechanical strut wedging action between said bolt member and said teeth of said washer means embedded in said second workpiece to prevent unauthorized retrogressive rotation thereof independent of the loss of the spring action of said spring-strut arms after annealing thereof by subjection of the entire assembly to sequential heating and cooling in the field environment.

3. In combination a bolt means and a washer means, said bolt means including shank means having a threaded entering end and an enlarged head portion at the opposite end, said head portion being characterized as having a bearing surface which flares from said shank upwardly and outwardly in a direction away from said entering end at an angle in excess of 90 degrees to the axis of said shank and continues to extend radially outwardly to gradually merge with said radially outwardly located portion of the bearing surface which provides said head portion, a plurality of ratchet means disposed radially outward of said bearing surface on the radially removed portion of said surface facing in the same direction as said bearing surface, said washer means adapted to be telescopically associated with said shank means and positioned adjacent said bearing surface, said washer means including body means initially disposed substantially normal to the axis of said shank means and having first and second opposed parallel initially substantially flat surfaces for respectively engaging at least a portion of said bearing surface of said bolt means and a complementary workpiece, substantially tangentially arranged tooth means formed adjacent to and radially outwardly of the outer periphery of the body of the washer, with their terminal ends being deflected from the body of the washer to present free end portions adapted to engage said ratchet means on said bolt means, and second tooth means formed on the outer periphery of the lock washer body intermediate said deflected teeth adapted to engage a complementary workpiece as the bolt means with said washer associated with it is rotated into clamping relation relative to the complementary apertured workpart.

References Cited by the Examiner

UNITED STATES PATENTS

| | | | |
|---|---|---|---|
| 543,695 | 7/1895 | Leroux | 151—39 |
| 853,005 | 5/1907 | Dawkins | 151—35 |
| 2,709,470 | 5/1955 | Knohl | 151—35 |
| 2,959,204 | 11/1960 | Rigot | 151—37 |
| 2,982,166 | 5/1961 | Hobbs | 85—9 |
| 3,032,089 | 5/1962 | Gutshall | 151—35 |
| 3,181,584 | 5/1965 | Borowsky | 151—37 |

FOREIGN PATENTS

| | | |
|---|---|---|
| 20,034 | 10/1895 | Great Britain. |
| 447,240 | 5/1936 | Great Britain. |
| 469,369 | 7/1937 | Great Britain. |

CARL W. TOMLIN, *Primary Examiner.*

R. S. BRITTS, *Assistant Examiner.*